(12) United States Patent
Kwiatkowski

(10) Patent No.: US 9,359,182 B1
(45) Date of Patent: Jun. 7, 2016

(54) PORTABLE BEVERAGE DISPENSER WITH SELF-RECHARGEABLE POWDERED ELECTRONIC BEVERAGE CONDITION DISPLAY ASSEMBLY

(71) Applicant: Food Equipment Technologies Company, Inc., Lake Zurich, IL (US)

(72) Inventor: Marek K. Kwiatkowski, Round Lake, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 90 days.

(21) Appl. No.: 13/969,932

(22) Filed: Aug. 19, 2013

(51) Int. Cl.
B67D 1/07 (2006.01)
B67D 1/08 (2006.01)
G08B 5/22 (2006.01)

(52) U.S. Cl.
CPC ............... *B67D 1/0888* (2013.01); *G08B 5/22* (2013.01)

(58) Field of Classification Search
CPC ......... H01L 35/30; G08B 5/22; B67D 1/0888
USPC ........... 222/146.1, 146.2, 146.5, 23; 136/205; 320/101
See application file for complete search history.

(56) References Cited

U.S. PATENT DOCUMENTS

| 7,798,373 | B1* | 9/2010 | Wroblewski et al. | 222/209 |
| 8,404,962 | B2* | 3/2013 | Birkeland et al. | 136/207 |
| 2010/0213212 | A1* | 8/2010 | Custodis et al. | 222/113 |

* cited by examiner

*Primary Examiner* — Kevin P Shaver
*Assistant Examiner* — Robert Nichols, II
(74) *Attorney, Agent, or Firm* — James W. Potthast; Potthast & Associates

(57) ABSTRACT

A portable, insulated, opaque, hot beverage dispenser (40) with a sensor (50), such as a level sensor, and an electronic display (48) is provided with a portable thermoelectric recharging power source (50), a portable photovoltaic recharging source (54), or both, to provide recharging power to a rechargeable power supply (42) which, in turn, provides electrical power to the display (48), a display controller (44) and the sensor power to the level sensor. A thermoelectric generator is mounted within a funnel 51 with a cold side (158) in thermal communication with ambient air outside of the interior (64) of the container body (52) of the dispenser (40) and a hot side (160) in thermal communication with the interior air within the interior (64) is mounted within a funnel (51) fitted into the open top (66) of the container body (52).

17 Claims, 10 Drawing Sheets

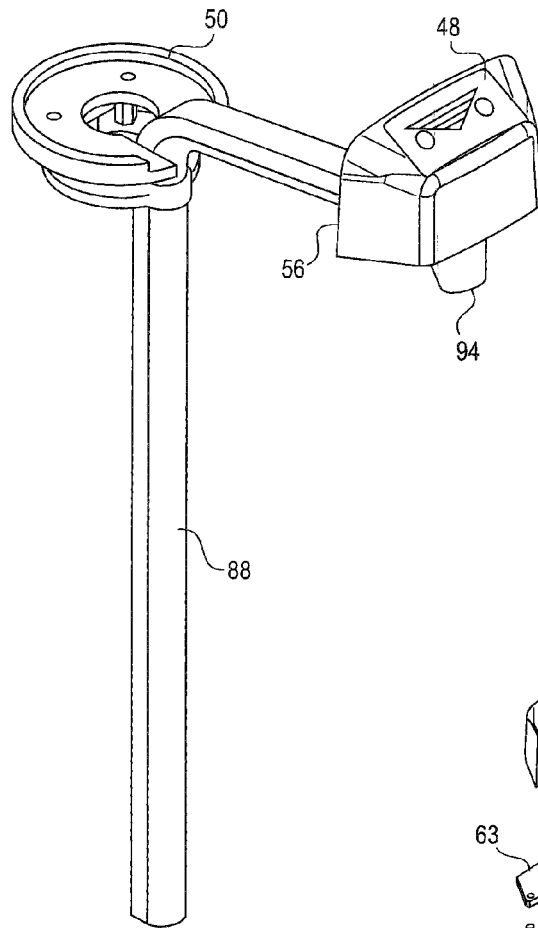
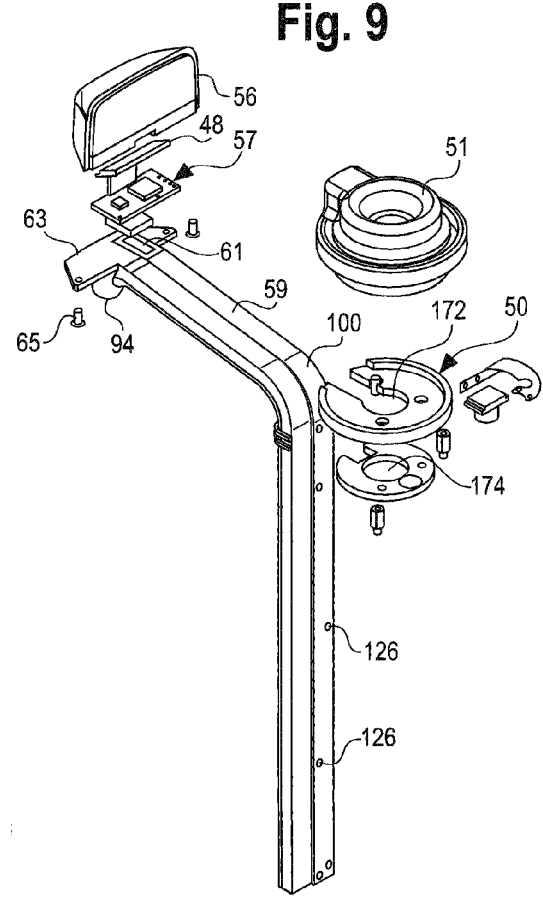

PORTABLE BEVERAGE DISPENSER WITH SELF-RECHARGEABLE POWDERED ELECTRONIC BEVERAGE CONDITION DISPLAY ASSEMBLY

BACKGROUND OF THE INVENTION

1. Field of the Invention

This invention generally relates to insulated, beverage dispensers and, more particularly, to such dispensers with electronic displays of a condition of the beverage, such as the level of beverage, the temperature of the beverage or the time since the dispenser was filled with hot beverage.

2. Discussion of the Prior Art

Insulated hot beverage dispensers for hot coffee, tea and the like that are fitted to directly receive hot beverage brewed directly into the dispenser from a mating hot beverage brewer are well known. After the dispenser is filled, it may be moved to a serving location remote from the mating brewer, such as in the interior of a restaurant dining room. After one dispenser has been filled and move away, another identical but empty dispenser may be mated with the brewer and filled without any need for delay. In this way, multiple dispensers may be filled in rapid succession from a single brewer. Generally, there are two types of large (one to three gallons) insulated dispensers: an airpot dispenser and a more conventional gravity feed dispenser. On a smaller scale, holding only one-half gallon or less are carafe type sensors In the airpot dispenser, beverage is forced out of a down spout at the top of the dispenser by increasing the internal pressure with a manual actuated bellows. In a gravity-feed dispenser the beverage is dispensed through a manually actuated faucet located at the bottom of the dispenser. In a carafe-type dispenser, the beverage is dispensed out of the top through a spout at the top of the carafe body.

In the airpot dispenser, such as the one shown in U.S. Pat. No. 7,798,373 issued Sep. 21, 2010 to Wroblewski et al. for "Airpot Beverage Dispenser and Method", which is hereby incorporated by reference, the interior of the dispenser is pressurized by manually actuating a bellows in a top cover to force beverage up a siphon tube, or dispense tube, to an outlet downspout located adjacent the top of the dispenser. Location of the outlet downspout enables coffee cups and the like to be located beneath the downspout and above a surface supporting the airpot dispenser.

In gravity feed dispensers, on the other hand, a faucet is located at the bottom of the dispenser body and the head pressure of the beverage within the dispenser body causes the beverage to run out of the faucet whenever the faucet is opened. This type of dispenser requires the faucet to be elevated sufficiently above a support surface to provide clearance for carafes or individual serving cups between the faucet and the support surface. Examples of gravity feed dispensers are shown in one or more of U.S. Pat. Nos. 6,135,009; 6,499, 628; 6,619,507; 6,702,153; 6,708,598; 6,845,704 and 6,820, 771, all of which are hereby incorporated by reference.

In the case of such dispensers, it is important for the staff or other persons using the opaque dispensers to have some way of knowing whether there is sufficient beverage within the insulated dispenser body for immediate needs. It is also desirable to know if the temperature of the hot beverage has been reduced beneath an acceptable level for serving. It may also be desirable to learn how long the beverage has been within the dispenser to provide and indirect indication of temperature or staleness. Because of durability and the use of insulation, such dispensers are generally made from opaque materials, such as stainless steel or other opaque materials. Accordingly, unlike a transparent, glass carafe, the level of the beverage cannot be seen. Accordingly, it is know to provide a sensor for detecting a physical characteristic of the beverage, such as beverage level, or quantity, and temperature, which is shown on an electronic display, such as shown in the aforementioned Wroblewski et al. U.S. Pat. No. 8,404,962 and in some of the other patents referenced above. It is also known to provide a non-physical characteristic of the beverage, such a the length of time since the beverage within the dispenser was brewed to provide an indirect indication of freshness or staleness.

A problem with known dispensers having such electronic displays is that the displays, sensors and display control circuitry are powered by either a non-rechargeable battery or storage capacitor or other electrical storage device which must be periodically replaced with a fresh electrical storage device when they become depleted to a level beneath which the display is capable of continued operation. Alternatively, if rechargeable batteries or the like are used, then they must also be removed from the dispenser to enable them to be recharged and then must be reinstalled after recharging. Such failure of the DC power supply needed to operate the display can happen without warning and thus can cause disruption in good service due to the dispenser being removed from service during battery removal and replacement or battery recharging and replacement.

Accordingly, the inventors have determined that there is a need to overcome or ameliorate these difficulties in known portable beverage dispensers with beverage level or temperature displays.

SUMMARY OF THE INVENTION

It is therefore an object of the present invention to provide a portable, insulated beverage dispenser assembly with an electronic display of a condition or characteristic of the beverage, such as beverage level or other characteristics noted above, that is electrically powered by a rechargeable DC power supply that is recharged by a portable thermoelectric generator carried by the dispenser.

This objective is achieved, in part, by providing a beverage dispenser with an opaque, insulated hollow container body with a thermally insulated interior extending between a closed bottom and an open top, a characteristic sensor capable of sensing a characteristic of the beverage within the hollow body, an electronic display module for displaying the characteristic of the beverage within the hollow container body, a rechargeable electrical storage device for providing electrical power for the display module and the characteristic sensor, a portable source of recharging current carried by the dispenser and connected to the rechargeable electrical storage device to recharge the electrical storage device, the portable source of recharging current including a thermoelectric generator module mounted to the container body with a hot side in thermal communication with the interior of the hollow body and a cold side in thermal communication with ambient air outside of the interior of the hollow body the thermoelectric generator generating electrical power to charge the rechargeable storage device.

In the preferred embodiment the thermoelectric generator module includes a housing that substantially entirely surrounds, electrically and thermally insulates and protectively covers the thermoelectric generator module except a thermally conductive cold plate attached to the cold side and a hot plate attached to the hot side. Thus, the cold plate is directly exposed to ambient air outside of the hollow body and the hot side is directly exposed to air inside the hollow body. The cold plate and the hot plate have a larger surface area that the cold side and the hot side to increase the rate of thermal energy flow between the hot side and the cold side and the surrounding interior or ambient air, respectively. The housing is annularly shaped and defines a funnel that is releasably mounted within the open top and an inlet smaller than the open top through which hot beverage is received into the interior of the hollow container body.

Also, in the preferred embodiment, the dispenser is an airpot-type dispenser including an elongate dispense tube extending from adjacent the closed bottom to a location exterior of the open top to enable the passage of beverage from the interior of the body to the exterior of the body, the physical characteristic sensor is a beverage level sensor that is carried along the length of the tube, and the thermoelectric generator is mounted to the dispense tube adjacent the open top. The dispense tube carries electrical connections between the thermoelectric generator and the rechargeable electrical storage device and between the beverage level sensor and the electronic display module.

BRIEF DESCRIPTION OF THE DRAWINGS

The foregoing objects and advantageous feature of the beverage dispenser of the present invention will be described in greater detail and other advantageous features will be made apparent from the following detailed description made with reference to the several figures of drawings, in which:

FIG. 8 is another perspective view similar to that of FIG. 7 but with the overmolded grommet-like funnel housing removed to enable viewing of parts of the thermoelectric power source of FIG. 3;

FIG. 9 is an exploded sectional perspective view of the dispense tube assembly of FIGS. 5, 6, 7 and 8;

DETAILED DESCRIPTION

Figure 1:
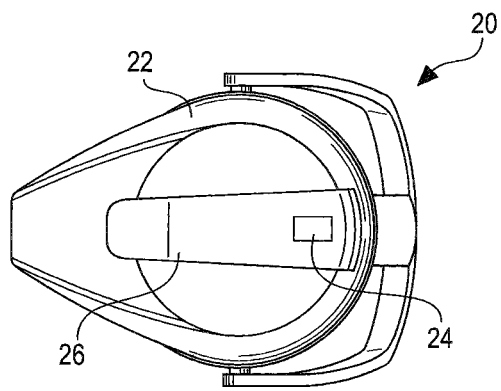
FIG. 1 is a plan view of a PRIOR ART Airpot dispenser of the type that may beneficially employ the present invention.
Figure 2:
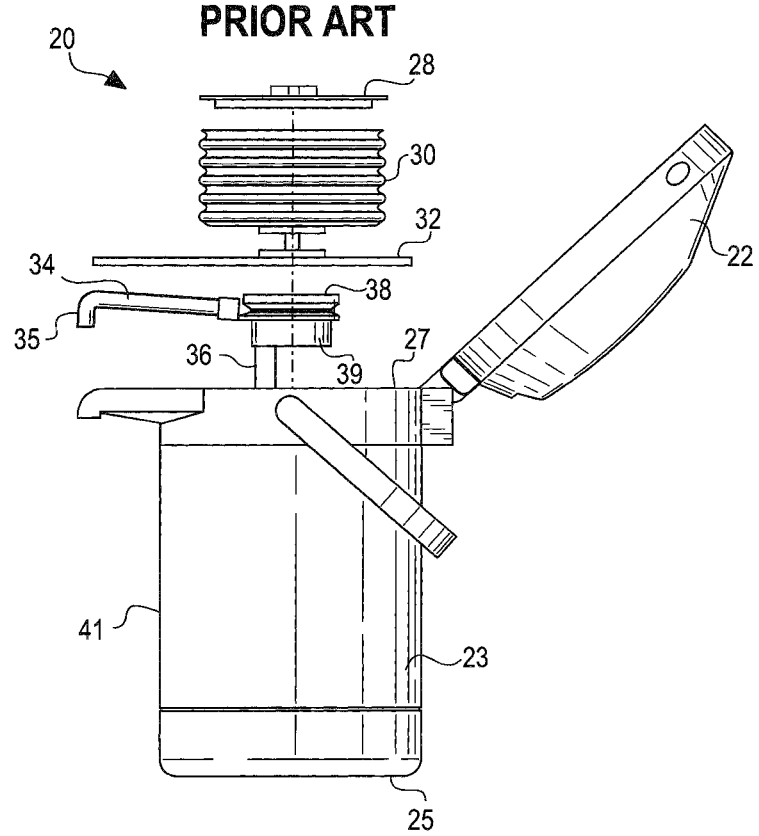
FIG. 2 is an exploded view of the PRIOR ART airpot dispenser of FIG. 1 showing the conventional parts that are also included in an airpot beverage dispenser embodiment of the present invention in addition to the novel elements.

Referring to FIGS. 1 and 2, a prior art, airpot-type hot beverage dispenser 20 is shown to illustrate the conventional items of such an airpot dispenser 20 that are also included in an airpot configured embodiment the self-powered portable beverage dispenser of the present invention and described below with reference to the remaining drawing figures. The airpot dispenser 20 includes a hinged cover 22 mounted to the top of an insulated, hollow, dispenser body 23 with a closed bottom 25 and an open top 27 for the receipt of hot beverage. Hot beverage is passed through a funnel opening 38 extending through a grommet-like funnel assembly including a funnel body 39 and an L-shaped dispenser tube mounted to and passing through the funnel body 39 at a location radially spaced from the funnel opening 38. The L-shaped dispenser tube has a non-vertical, substantially horizontal section 34 that extends radially outwardly from the funnel body 39 to a downturned downspout 35 spaced outwardly from the side 41 of the insulated dispenser body 23. A vertical section 36 extends downwardly from the bottom of the funnel body 39 to a location adjacent the closed bottom 25. The vertical section 36 and the non-vertical section 34 are joined to each other by a right angle curved section (not shown) that is supported within a mating mounting hole within the funnel body 39.

Contained within the hinged cover 22 is a bellows assembly including a bellows cap 28, a bellows 30 and a bellows cap plate 32. A lever 26 is mounted to the cover 22 and may be released to an elevated position when a locking tab 24 is actuated. When the cover is closed and the lever is moved downwardly from the elevated position, the bellows 30 is pressed downwardly against the bellow cap plate 32 to force air into the interior of the hollow body 23. The increase in air pressure causes any beverage within the container to enter the opening to the vertical section 36 of the dispense tube, rise upwardly through the vertical section 36, through the curved section and then along the horizontal section 34 and out of the down spout 35. A check valve (not shown) prevents return of the air within the hollow body to the bellows.

The prior art air pot dispenser 20 may only be filled when the cover 22 is in an open position, as shown in FIG. 2, and may only be actuated to dispense beverage through the down spout 35 when the cover 22 is closed. On the other hand, in the aforementioned U.S. Pat. No. 7,798,373 of Wroblewski et al., hereby incorporated by reference, another airpot type dispenser is shown with a flow through design in which the beverage may be passed into the insulated hollow body through an opening and passageway through the lid when the lid is closed. In addition, in the airpot of Wroblewski et al., a level sensor attached to the vertical section 36 of the dispense tube is used to provide input to an electronic beverage level display mounted to the top of the dispenser body. The present invention may also be successfully employed with an airpot of this flow through design.

Unfortunately, the electronics for the display and level sensor in the airpot dispenser of Wroblewski et al. and other types of dispensers which have beverage condition displays are powered by a battery that could only be recharged or replaced by removing the battery from an electronics housing containing the electronic display and other circuitry. Such recharging or replacing of the battery may unfortunately require the costly attention of technical service personnel and otherwise results in the dispenser having to be removed from service for this purpose or to be used without the beverage characteristic being displayed.

In addition to airpot dispensers, the present invention may be employed with any other type of portable hot beverage dispenser including gravity feed-type dispensers with a faucet connected to the bottom of the dispenser, as shown in: U.S. Pat. No. 6,884,452 entitled "Method of Serving Freshly Brewed Beverage From a Dispenser"; U.S. Pat. No. 6,135,009 entitled "Brewing System with Dispenser Urn Loading Apparatus and Method"; and U.S. Pat. No. 7,980,422 entitled "Portable Beverage Dispenser with Electronic Beverage Characteristic Display and Method", all of which are hereby incorporated by reference. In such gravity feed dispensers, there is no dispense tube, since beverage is dispensed from a faucet located at the bottom of the dispenser body. However, there is a fill tube which extends from an outlet of the funnel in the open top to pass newly received beverage to the bottom. This fill tube may also be used in lieu of a dispense tube of an airpot dispenser to carry a level sensor that is connected to a level display at the top of the dispenser. Again, however, just like the known airpot dispensers, these gravity feed dispensers also require removal and replacement of worn batteries.

Additionally, the invention may also be successfully employed with an insulated carafe-like dispenser in which beverage is dispensed out of a spout at the top of the insulated carafe body when the carafe is manually tipped sideways. In such case, a downwardly extending member may be specially provided to carry a level sensing element within the interior of the carafe. In the absence of an elongate member extending into the interior of the dispenser body, level may still be measured with sonic sensors carried by the funnel or by other sensing means built into the dispenser body. Likewise, temperature sensors may mounted by means of the funnel or otherwise adjacent the top of the dispenser.

In general, it should be appreciated that the self-recharging, powered display assembly and the self-powering concept and method of the present invention may be implemented in a similar fashion to all of the different types of dispensers that are opaque and thus need an electronic beverage level indicator.

Figure 3:
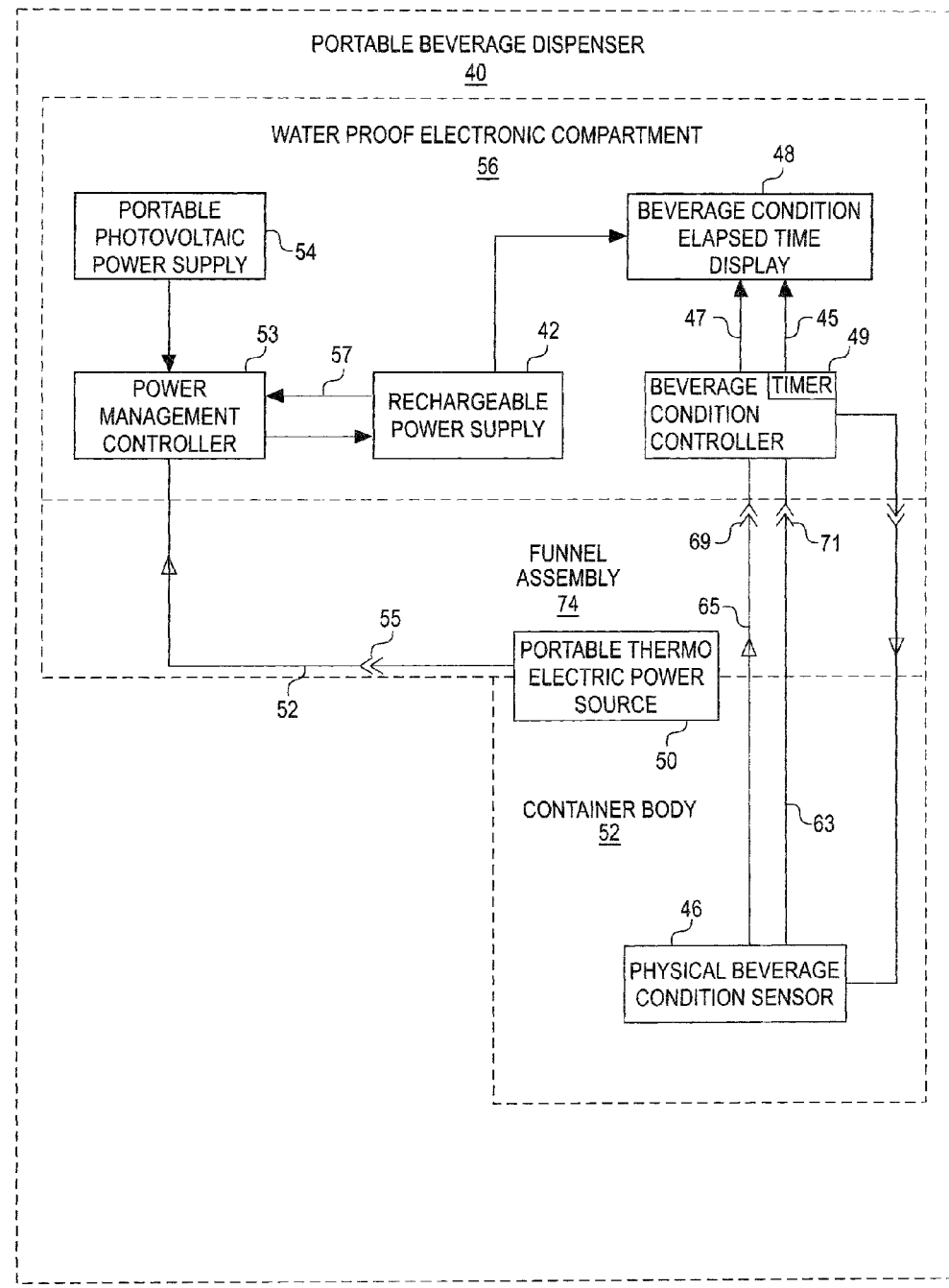
FIG. 3 is a functional block diagram of a preferred embodiment of the beverage dispenser with self-rechargeable powered display of the present invention.

In accordance with the self-powered electronic display assembly of the present invention, regardless of with which type of dispenser it is used, the need for removal of worn-out or depleted batteries, storage capacitors or the like used to power beverage condition sensors and displays is substantially ameliorated. Referring to FIG. 3, a portable beverage dispenser 40 is provided with at least one source of self-generating, electrical recharging power to intermittently recharge a rechargeable dc power supply, or rechargeable electrical storage device, 42. The rechargeable power supply 42 is a rechargeable battery, such as a Type 6127 CR ½ AA Varta™ lithium-manganese dioxide/organic electrolyte, 3-volt rechargeable battery with typical capacity of 950 mAh, made by Sanyo Semiconductor Co., Ltd. Alternatively, a rechargeable storage capacitor such as a high power and energy density, ultra-low effective series resistance cap-XX™ super capacitor made by cap-XX Pty. Ltd. of Lane Cove NSW 2006, Australia.

The rechargeable power supply 42 is used to provide electrical power to a beverage condition display controller 44, to a physical beverage condition sensor 46, to a beverage condition display 48 and to a power management controller 53. The physical beverage condition sensor 46 may be a level sensor (resistive, capacitive, sonic, photo or other), a temperature sensor, both a level sensor and a temperature sensor or any other type of sensor that senses an actual physical condition of the beverage.

In addition, because the beverage may deteriorate over time even if the temperature is maintained at an acceptable level, the beverage condition controller 44 may be provided with an elapsed-time timer, or freshness timer, 49 which is used to measure the time elapsed since the dispenser was initially filled with hot beverage. The timer 49 is automatically reset to start timing in response to either a temperature sensor detecting a rapid increase in temperature or a level sensor detecting the level of the beverage rising to a preselected minimum level. Alternatively, the timer 49 may be manually started by actuation of a fresh fill timer start switch (not shown) connected with the beverage condition controller. The time measured by the timer may be displayed as a numeral, as a moving freshness scale or any other representation from which user may interpret the length of time elapsed or the level of freshness based on the time elapsed. In any event, whichever physical conditions are being sensed by the physical beverage condition sensor 46 and whatever freshness time has been generated by the timer 49 is provided through suitable interface circuitry to the display controller 44.

The display controller 44 responds to electrical signals responsive to the physical condition sensors 46 and to the timer 49 to provide appropriate electrical display signals to the beverage condition display 48 through electrical connections 47 and 45, respectively. The beverage condition display 48 responds to these electrical display signals to visually display the sensed physical conditions, such as level and temperature, and the elapsed-time condition. The display 48 is preferably an LCD, an indicator light or any other type of electronically operable visual display cable of providing a visual representation of the condition of the beverage and the elapsed time. It is contemplated that any one, any combination or any one of the temperature, beverage level and elapsed time may be used in accordance with the present invention.

Figure 4:
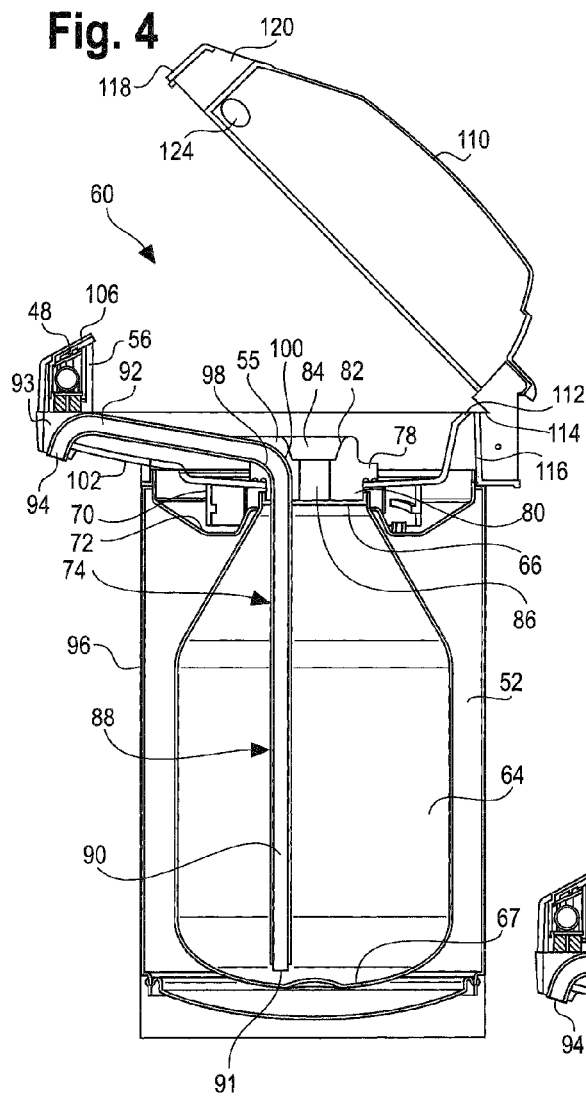
FIG. 4 is a sectional side view of one embodiment of the beverage dispenser of the present invention in which the beverage condition display of FIG. 3 is fixedly attached to a non-vertical section of a dispense tube of a dispense tube assembly adjacent a down spout and protectively contained within a waterproof electronics compartment along with the other electronic components as indicated in FIG. 3.
Figure 5:
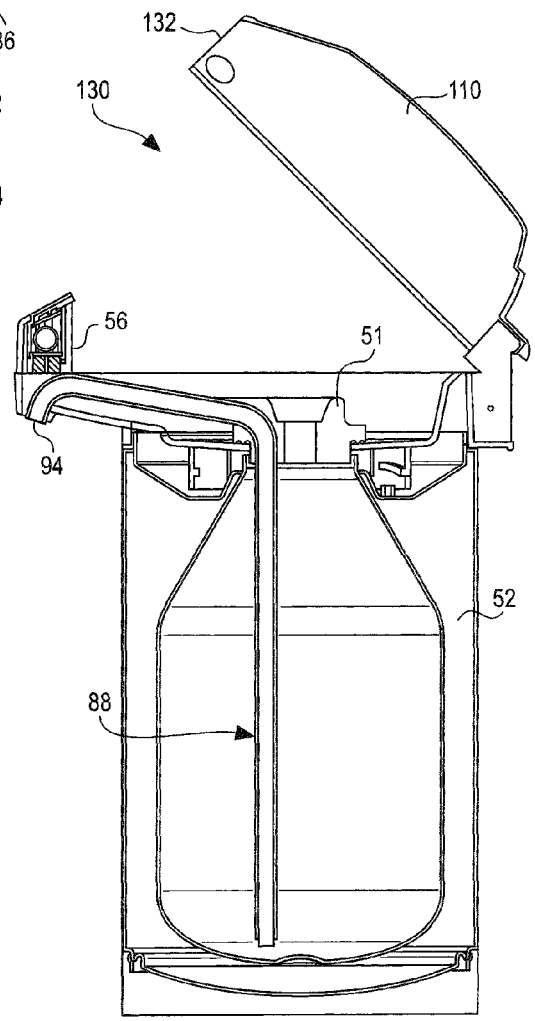
FIG. 5 is a sectional side view of another embodiment of the beverage dispenser of the present invention similar to that of FIG. 4 but in which the pivotally mounted cover does not protectively surround the waterproof compartment as is done in the embodiment of FIG. 4.
Figure 7:
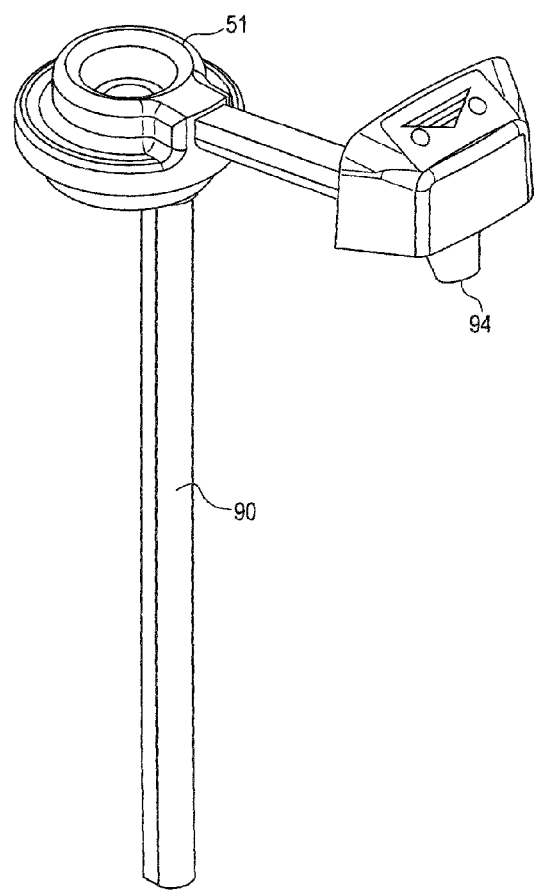
FIG. 7 is a perspective view of the funnel assembly of FIG. 6 with an overmolded grommet-like funnel housing of FIG. 6 protectively covering the portable thermoelectric power source of FIG. 3 and mounting it in relationship with the interior of the dispenser body.

Unlike known dispensers with electronic displays, the self-powered beverage dispenser 40 of the present invention has at least one portable source and preferably two portable sources of recharging power for the rechargeable power supply 42 that are carried by and comprise part of the portable beverage dispenser 40. One of the portable sources of recharging power is a portable, thermoelectric recharging power source 50. The thermoelectric recharging power source 50 is electrically connected via conductive leads 52 to the power management controller 53 that, as noted above, is powered by rechargeable power source 42. In the embodiments of FIGS. 4 and 5 the leads 55 are fixedly connected between the power management controller 53 and the thermoelectric power source 50. In the embodiment of FIG. 7, in which the display is carried by a pivotally mounted cover, the leads 50 pass through releasable mating electrical connectors 55.

Another portable source of recharging power is a portable photovoltaic power supply 54 which is fixedly connected to a second input of the power management controller 53. The power management controller 53 also receives an input from the rechargeable power supply 42 indicating the power storage level of the rechargeable power supply 42 and selectively provides electrical recharging power to the rechargeable power supply 42 from one or both of the portable thermoelectric power source 50 and the portable photovoltaic power supply 54, when available, and when the rechargeable power supply 42 is in good condition to receive recharging power.

The DC operating voltage for the power management controller 53 is provided via a connection 57, for the beverage condition controller 44 via a connection 59 and for the beverage condition and elapsed time display 48 via an electrical connection 61. Operating power from the rechargeable power supply 42 is provided to the physical beverage condition sensor 46 through the beverage condition sensor 44 via a connection 63 while sensor signals are provided to the beverage condition controller 44 via a connection 65. In the embodiments shown in FIGS. 4 and 5, the connections 52, 65 and 63 are fixed while in the embodiment shown in FIG. 10 the connections are made through releasable mating connectors 55, 69 and 71, respectively.

As schematically illustrated in FIG. 3, the thermoelectric recharging power source is mounted at the top of an insulated, container body 52 in order to be in thermal communication with both the relatively hot air within the insulated container body 52 and with relatively cooler ambient air outside of the insulated container body 52. The thermoelectric recharging power source 50 has a thermoelectric generator which generates electrical power in response to a temperature differential between opposite sides of the generator causing heat to flow through the generator. The thermoelectric generator is protectively mounted within a funnel 51 that releasably, snugly fits into an open top of the container body 52. When the funnel 5 is fit into the open top of the container body 52, one side, a so-called hot side, is in thermal communication with the interior air within the container body 52. The interior air is approximately at the same temperature as the beverage within container body 52. The beverage temperature starts at a relatively high temperature when the container body 52 is first filled, approximately 190-degrees to 208-degrees Fahrenheit.

The beverage gradually cools, despite thermal insulation, but will usually be consumed long before the beverage cools to the temperature of the ambient air outside of the interior of the container body 52 and surrounding the beverage dispenser 40. Accordingly, there is usually a substantial temperature differential between the interior air within the insulated container body 52 and the ambient air surrounding the portable beverage dispenser 40, which is usually maintained at approximately 72-degrees Fahrenheit. Another side of the thermoelectric generator, a so-called cold side, is located oppositely from the hot side and in thermal communication with the ambient air outside of the interior of the insulated, hollow container body 52 and surrounding the portable beverage dispenser. Because of the temperature differential of approximately 120-degrees to approximately 136-degrees, heat flows through the body of the thermoelectric generator between the hot side and the cold side. This heat flow energy is converted to electrical energy by the thermoelectric power source 50 which is selectively passed through the power management controller 53 to provide charging current to the rechargeable power supply 42.

The other portable source of recharging power is the portable photovoltaic power source 54. The photovoltaic power source 54 contains a photocell array that is exposed to light energy on the outside of the interior of the container body 52 and converts that light energy to electrical energy to assist in powering the rechargeable power supply 42. The photocell array is preferable mounted to at least one, any combination or all three of the top of a pivotal cover, the sides of the cover and the display. Advantageously, even if there is not enough ambient light to provide sufficient recharging power from the photovoltaic recharging power source 54, alone, to maintain good operation of the sensor 46, the display controller 44 and the beverage condition display 48, sufficient power may still be provided by the thermoelectric recharging power source 50. Likewise, when the beverage temperature has been reduced, such that the recharging power available from the thermoelectric recharging power source 50 is not, alone, sufficient, there may still be sufficient ambient light energy from the photovoltaic recharging power source 54 to maintain operation of the electronic elements being powered by the rechargeable power supply 42. In either event, the use of two separate sources of recharging power insures that there will be at least one functioning source of recharging power even if one should fail to operate.

In keeping with one aspect of the invention, if the level of ambient light, such as from overhead ceiling lighting, in whatever serving location the dispenser 40 may be located is insufficient to maintain the rechargeable power supply at an acceptable charge level, the photocell array may be closely mounted in direct light receiving relationship with a high intensity light source during receipt of beverage or at the serving location.

Still referring to FIG. 3, the rechargeable power supply 42, the beverage condition display controller 44 and timer 49, the beverage condition and lapsed time display 48 and the portable photovoltaic recharging power source 54 are all protectively contained within a waterproof electronics compartment 56 outside of the interior of the container body 52. The portable photovoltaic recharging power source 54 is also contained within the waterproof electronic compartment 54. The water proof electronics compartment 56 has a transparent window in order to receive luminal power within the compartment 56 to impinge on the photocells of the photovoltaic power supply 54 within the electronics compartment 56.

On the other hand, the portable thermoelectric recharging power source 50 within the funnel assembly is partly within and partly without, the interior of the container body 46. The physical beverage sensor 46, such as a level sensor is within the container body 52, while a temperature sensor is preferably mounted within the funnel 51 and merely exposed to the hot air within the container body 51. While only a single photovoltaic power supply and only one portable thermoelectric power source 50 is illustrated, it should be appreciated that more than one of each may be provided to generate greater levels of recharging power as may be needed and to provide backup redundancy in case one or more of the recharging power sources should fail. Likewise, more than one rechargeable power supply could be provided, either jointly sharing power from all recharging sources or being individually respectively associated with different regeneration power sources.

Turning now to FIGS. 4 and 5, two similar particular embodiments of the portable beverage dispenser 40 of FIG. 3 are seen to be airpot-type dispensers 60. The embodiments of FIGS. 4 and 5 are substantially identical to each other especially with respect to the dispense tube assembly 74 of FIG. 4, which are identical. The only difference between the two embodiments of FIGS. 4 and 5 is that in the embodiment of FIG. 5 there is no forward section 118 of the cover 110 that fits over and around the waterproof electronics compartment 56 as there is in the embodiment of FIG. 4. Instead, the cover has a flat front surface 132 that abuts against the back side of the waterproof electronics compartment 56 when the lid 110 is closed.

Figure 6:
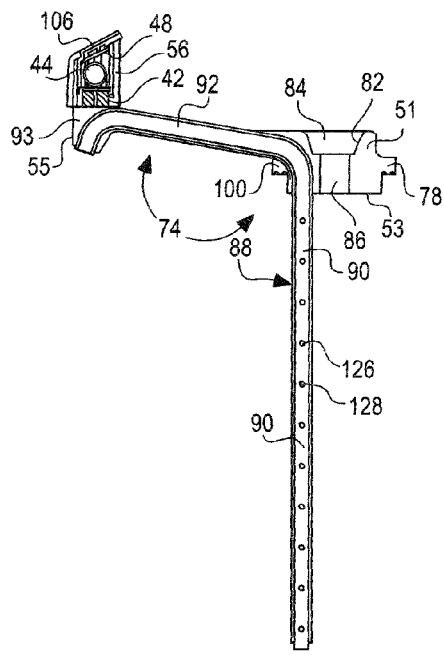
FIG. 6 is a sectional side view of the dispense tube assembly of the FIGS. 4 and 5 that has been separated from the remainder of the beverage dispenser to facilitate a clearer view of the parts of the assembly.

Each of the self-powered dispensers of FIGS. 4, 5 and 6 has an insulated hollow body 52 with an interior 64 extending between an open top 66 and a closed bottom 67. A cover 110 is hingedly mounted to a cover mounting assembly 70. The cover mounting assembly 70 is supported within an annular depression 72 of the dispenser body 62 surrounding the open top 66 and, in turn, supports the grommet-like funnel housing 51 of the funnel assembly 74. The funnel housing 51 is supported within a central, circular opening located slightly above, and aligned with, the central top opening 66 of the interior 64. The funnel 51 has a radially outwardly extending collar 78 with an underside that is supported by an annular portion of the cover mounting assembly 70 surrounding the top central opening 66. A lower plug portion 80 is snuggly fitted into the interior opening 66. Another circular section extends upwardly above the collar 78 and carries a funnel opening 82 and a relatively narrower funnel passageway 86 at the bottom of the funnel 51 leading to the interior opening 66.

The funnel housing 51 also carries a hollow cylindrical dispense tube 88 with a vertical section 90, a non-vertical, approximately horizontal section 92 and a curved intermediate section 98 that joins the vertical section 90 and the non-vertical section 92 adjacent to and above the open top 66. The vertical section 90 extends from a downwardly curved end of the intermediate section 98 and downwardly toward the bottom of the funnel housing 51 to an inlet opening 91 adjacent the bottom 67. A non-vertical section 92 of the dispense tube extends radially outwardly from an outwardly facing end of the curved intermediate section 98 to a downwardly turned downspout 94. The downspout 94 is spaced outwardly from the front side 96 of the dispenser body 52 to allow receipt of a coffee cup directly beneath the downspout 94.

The curved intermediate section 98 that interconnects the upper part of the vertical section 90 and the inner part of the non-vertical section 92 is contained, together with adjacent parts of the non-vertical section 92 and the vertical section 90 within a congruently curved mounting hole 100 within the funnel housing 51. The mounting hole 100 passes through the body of the funnel 51 between the bottom 53 of the funnel 51 and a forwardly facing part 55 of the funnel 51. Because the mounting hole 100 is snug and the two end openings face in different directions, the dispense tube 88 is restrained against sliding movement within the passageway 100 and is generally fixedly mounted to funnel 51. Thus, the body of the funnel 51 and the mounting hole 100 provide support for the dispense tube 88 in the position shown when mounted within the open top 66. Additional underlying support for the distal end of the non-vertical section 92 is provided by a laterally, forwardly, outwardly extending part 102 of the funnel mounting assembly 70.

The non-vertical section 92 of the dispense tube 90 is relatively horizontal compared to the vertical section 88 but has an approximately ten degree inward, downward slant toward the intermediate section 100. The inward, downward slant causes any beverage that has risen up the non-vertical section but not exited from the spout 94 for lack of back pressure to flow back into the interior 64.

As best seen in FIG. 6, mounted to the juncture, between the non-vertical, cantilevered section 92 and the down spout 94, is the waterproof electronics compartment 56 that protectively contains the rechargeable power supply 42, the power management controller 53, the beverage condition display controller 48, the beverage condition display 48 and the portable photovoltaic recharging power source 54 of FIG. 3. Portions of the electronics compartment 56 are transparent to enable viewing of the electronic beverage condition display 48 and to enable ambient light to impinge upon the photovoltaic cellular array 106. While many different makes and types of photocells may successfully be employed, preferably the photovoltaic array is made using Amorton™ amorphous silicon solar cells made by Sanyo Semiconductor Co., Ltd. The compartment 56 is mounted to the end of non-vertical section 92 above the downspout 94 by means of a plastic mounting member 93 that encases the downspout 94 and a part of the non-vertical section 92 adjacent to the downspout 94. Additionally, when a lid, or cover, 110 is closed, parts of the lid 110 mate with the sides of the compartment 56 to provide additional lateral support and protection.

The lid 110 is attached to the open top 112 by a hinged connection 114 with an elevated section 116 of the funnel mounting assembly 70. The cover 110 has a concave shape and mounts a bellows and bellows actuation lever (not shown) like those illustrated in FIGS. 1 and 2. In addition, the cover 110 includes a forward section 118 that fits over and around the waterproof electronics compartment 56 to severally provide support, protection against collision and a neat appearance. An upwardly facing opening 120 enables viewing of the display 48 and enables light to impinge upon the photovoltaic array 106 when contained within the electronics compartment. The lid 110 is locked in a closed position by suitable spring-loaded locking mechanism, but a lid lock release button 124 is actuated to release the locking mechanism to enable the lid 110 to be moved to the open position, as shown in FIG. 4.

Referring also to FIGS. 6, 7 and 8, the vertical section 90 of the dispense tube 88 carries along its length a plurality of beverage levels sensors 89 of the beverage condition sensors 46. The level sensors 89 are in the configuration of a plurality of exposed conductive level sensing sensor pads 126 at a plurality of different locations respectively associated with a plurality different beverage levels and insulated leads (not shown) independently connecting each of the level sensing sensor pads 126 with the beverage condition display controller 44 within the waterproof electronics compartment 56. Based on signals from the sensor pads 126, the display controller 44 ascertains the level of the beverage and controls the display 48 accordingly. Instead, of sensing the level by means of changes in resistance, the sensor pads may be substituted with insulated, covered capacitors plates, and changing capacitance levels provide an indication of the level. The vertical section 90 may also carry a temperature sensor 128 which is also connected to the display controller 44 via leads extending along the vertical section 90 to enable display of the beverage temperature. The details of the sensors 124 and 126 form no part of the present invention, and if further details are desired, reference should be made to relevant ones of the U.S. patents noted above, which are hereby incorporated by reference.

Referring to FIG. 8, the dispense tube 88 is seen to have a rectilinear cross-section which adjacent the curved section 100 interlocks with mating slots 101 and 103 to mount the thermoelectric power source 50 to the vertical section 90 attach in parts of the thermoelectric power source 50. After the assembly shown in FIG. 8 is accomplished, then the funnel housing 51 is overmolded to surround and protectively encase the thermoelectric generator 50, as seen in FIG. 7.

Referring to FIG. 9, the details of a preferred embodiment of the funnel assembly 74 of FIG. 5 are illustrated. The funnel assembly 74 includes the dispense tube 88, the funnel housing 51, the electronics compartment 56 and the electronics 57 contained therein as noted above with respect to FIG. 3. A conductive tape 59 is adhered to the outside of the of the dispense tube 88 with conductive leads making connection with the electronics 57 via a connector 61 at one end, making connection with the thermoelectric power source adjacent the curved section 100 and with the level sensor pads 126 along the vertical section 90. The electronics compartment 56 including the display 48 and all the other electronics 57 are mounted to the top of a mounting plate 63 attached to the end of the non-vertical section 92 directly above the spout 94 by means of threaded fasteners 65.

Figure 10:
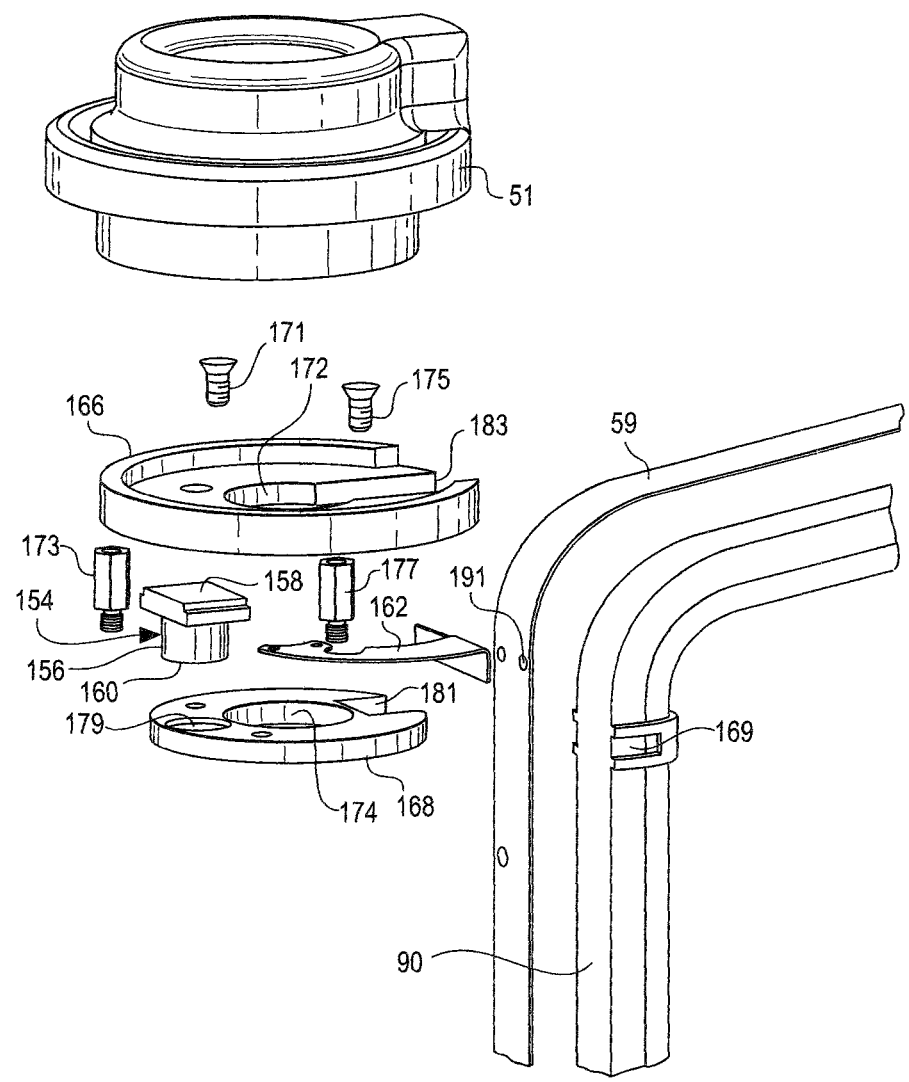
FIG. 10 is an enlarged exploded perspective view of the funnel assembly of FIG. 9.
Figure 11:
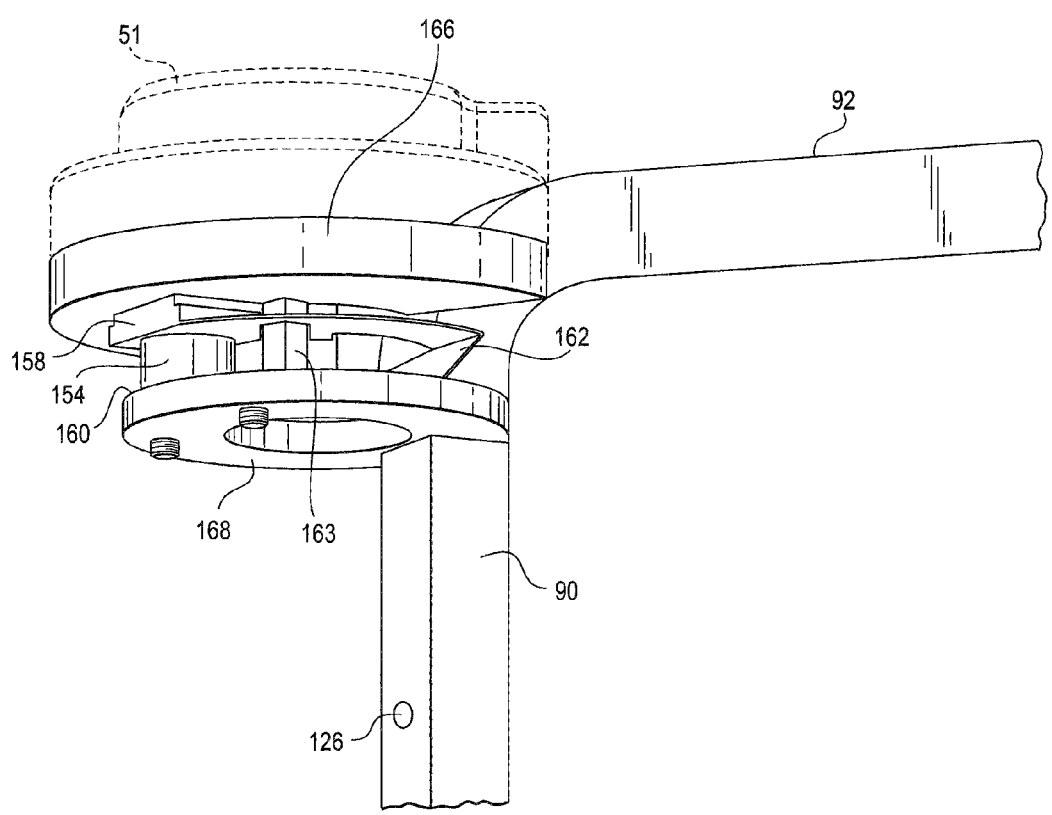
FIG. 11 is an enlarged perspective view of the thermoelectric power source elements of the funnel assembly as connected with each other and to the dispense tube of FIGS. 6-11.

Referring to FIGS. 10 and 11, the funnel housing 51 protectively encases the portable thermoelectric recharging power source 50. The thermoelectric power source 50 includes a thermoelectric generator 154 having a generally cylindrical body 156 extending between a generally rectangular, plate-like cold side 158 at an upper end and a circular hot side 160 defined by a cross section of the cylindrical body 156 at an opposite lower end. An arcuate electrical connector 162 makes electrical connection between output terminals of the thermoelectric generator 154 at the underside of the upper cold side 158 (not shown) and a mating connector 164 carried by the vertical section 90 of the dispense tube 88. While other rechargeable power sources 42 may be used a Varta™ CR½ AA lithium manganese dioxide organic electrolyte battery with a nominal voltage of 3-DC volts and a capacity of 950 mAh made by Sanyo Semiconductor co., Ltd has been found to work well. While other makes and types of thermoelectric generators may be used, a TGP-751 OR TGP-651 thin film thermogenerator made by Micropelt GmbH has been found to work satisfactorily.

A generally annular, disc-like, thermally conductive metal cold plate 166 substantially larger than the cold side is attached to the top of the cold side 158 in direct thermal communication therewith. Likewise, a generally annular, disc-like, thermally conductive hot plate 168 substantially larger than the hot side 160 is attached to the hot side 160 in direct thermal communication therewith. The thermoelectric generator 154 is sandwiched between the cold plate 166 and the hot plate 168 and held in place by suitable non-thermally conductive mating threaded fasteners 171 and 172, and 175 and 177 that interconnect with each other and with the hot plate 168 and the cold plate 166. The hot plate 168 fits into an upward facing circular mounting depression 179 in the top surface of the hot plate 168 to hold it in correct alignment. Mounting slots 181 in the hot plate 168 snap fit with a mating connector 169 with the connector 162 making connection with corresponding contacts of the conductive lead ribbon carry strip 59. A slot 183 in the cold plate 166 is fitted around the vertical section 90.

After all the elements of the thermoelectric power supply 50 are assembled and attached to the dispense tube, it is overmolded with the funnel housing 51. The assembly may also be coated with epoxy or polyurethane conformal coating before the funnel 51 is overmolded. The funnel 51 is preferably made from a moldable silicon material which is thermally and electrically insulating.

Figure 12:
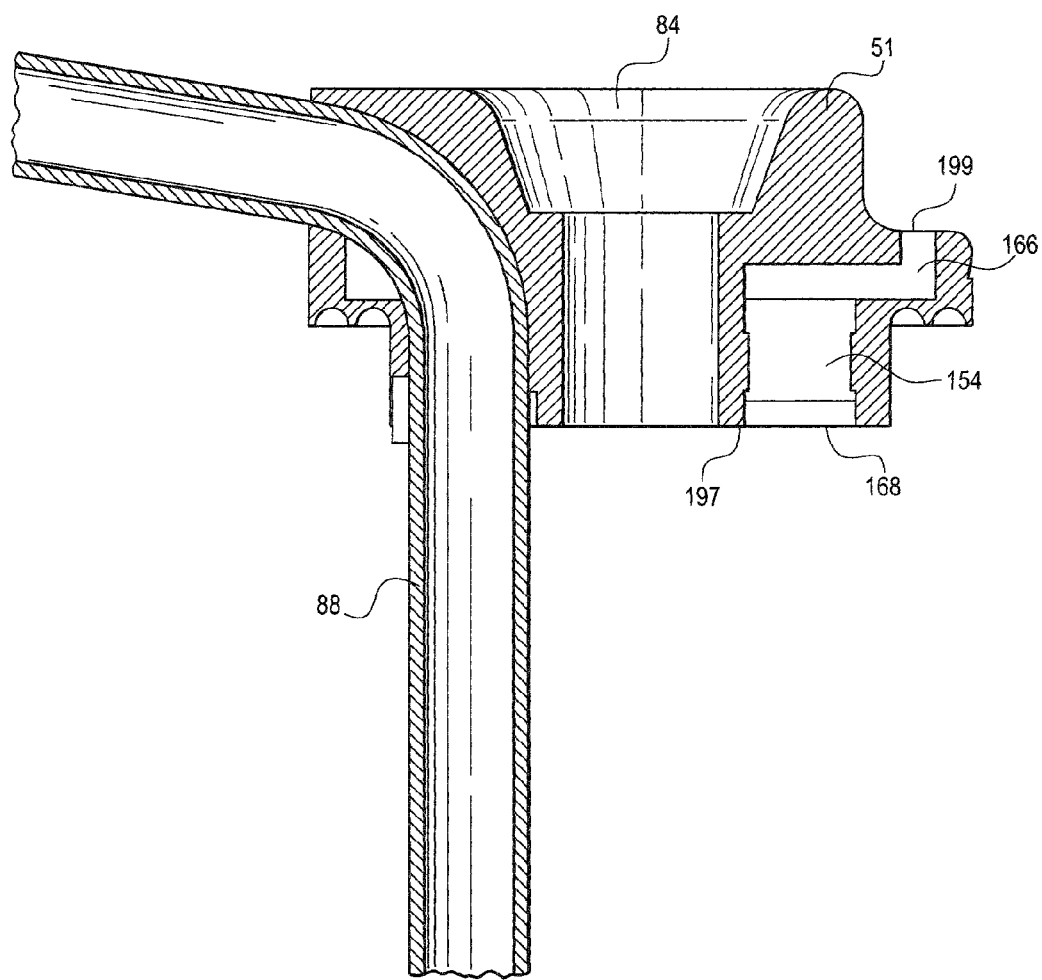
FIG. 12 is an enlarged, sectional side view of the assembled elements of the thermoelectric power source and illustrating exposure of a cold side of the thermoelectric generator to ambient air and exposure of a hot side to air within the interior of the dispenser body.

As best seen in FIG. 12, the overmolded housing 51 has a passageway or opening 197 to expose the hot plate 168 to air within the container and a passageway or access opening 199 to enable direct contact and thermal communication of the cold plate 166 with the ambient air outside of the container. However, importantly, at least a part of the bottom surface of the hot plate 168 and the top surface of the cold plate 166 are left uncovered either by the silicon molded funnel housing or by any other coating. This enables direct exposure to air to maximize thermal communication of the hot plate and hot side with the heat within the hollow body 64 and maximum direct exposure and thermal communication of the cold plate and cold side with the ambient air outside of the interior of the hollow body 64.

The opening 84 of the funnel 150 is centrally aligned with a central axis of symmetry of the hollow body 64. The opening 84 is also aligned with holes 172 and 174 of the cold plate 166 and the hot plate 168. Both of the cold plate 166 and the hot plate 168 are substantially annular shaped plates having a surface area substantially larger than that of either the cold side 158 or the hot side 160. The cold plate has an upstanding perimeter wall 173 for to mate with a corresponding part of the molded housing 51.

As best seen in FIGS. 9 and 10, the thermoelectric generator is 154 is located on one side of the aligned holes 172 and 174 that is opposite to the side to which the vertical section 90 is attached to reduce thermal communication between beverage flowing through the dispense tube 88 and the thermoelectric generator.

Figure 13:
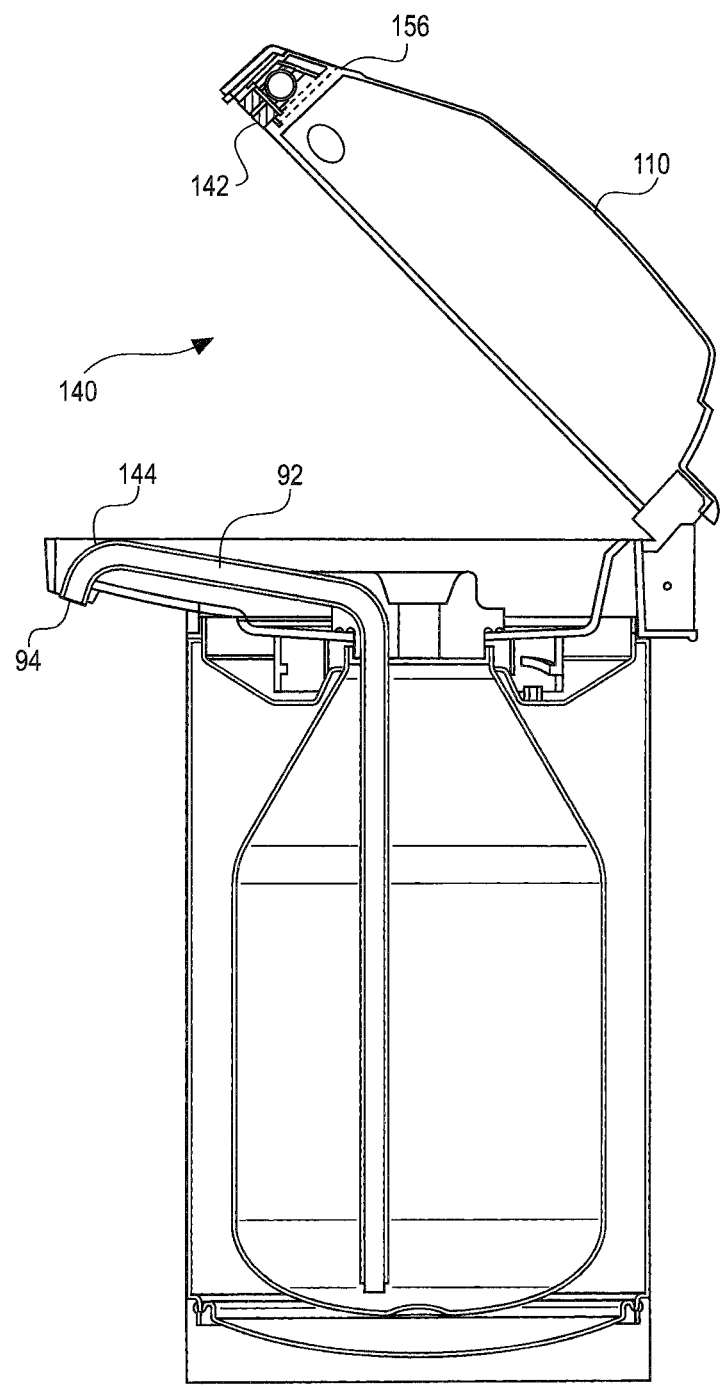
FIG. 13 is a sectional side view of another embodiment of the beverage dispenser of the present invention similar to those shown in FIGS. 4 and 5 but in which the display module is carried within a protective housing carried by the pivotal lid instead of being fixedly attached to the dispense tube assembly and in which connection with the sensors and thermoelectric generator is achieved through detachable mating electrical connectors that mate with each other when the pivotal cover is closed.
Figure 14:
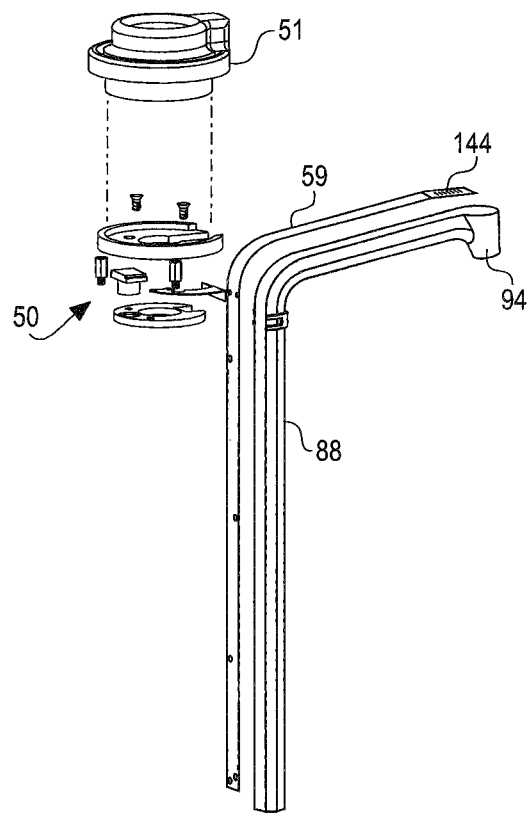
FIG. 14 is a sectional, exploded side elevational view of the dispense tube assembly of FIG. 13.
Figure 15:
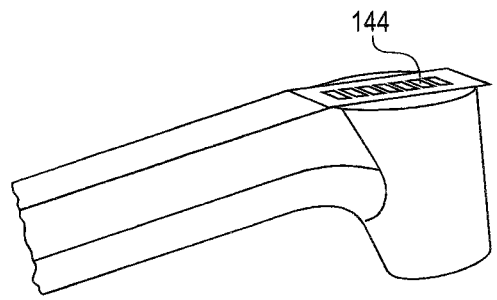
FIG. 15 is a perspective view of an enlarged portion of the dispense tube assembly of FIG. 12 located adjacent a spout and carrying one side of a mating, separable electrical connectors for connection with corresponding mating, separable connectors carried by the display assembly of FIG. 7 when the pivotal cover is closed

Referring to FIGS. 12, 13 and 14, another embodiment of 140 of the portable beverage dispenser is shown that is similar to that of FIG. 4, but in which the electronics compartment 56 is mounted to the forward section 118 of the lid 110 instead of to the dispense tube 88. A releasable electrical connector 142 carried at the bottom of the electronics compartment 56 makes contact with a mating connector 144 carried at the top of the non-vertical section 92 when the cover 110 is moved to a closed position. This enables the dispense tube 88 with the attached funnel 51 to be removed and cleaned without subjecting the relatively more fragile electronics compartment 56 to the cleaning process. In such case, the funnel assembly 44 does not include the electronics contained within the electronics compartment 56 but still retains the funnel 51, the dispense tube 88 and the thermoelectric generator recharging power source 50 protectively contained within the funnel 51.

While a particular embodiment has been disclosed in detail, it should be appreciated that many changes may be made without departing from the spirit and scope of the invention, as defined in the appended claims.

The invention claimed is:

1. A beverage dispenser, comprising:
   an opaque, insulated hollow container body with a thermally insulated interior extending between a closed bottom and an open top;
   a beverage characteristic sensor capable of sensing a characteristic of the beverage within the hollow body;
   an electronic display module responsive to the sensor for displaying the characteristic of the beverage within the hollow container body;
   a rechargeable electrical storage device for providing electrical power for the display module and the beverage characteristic sensor; and
   a portable source of recharging current carried by the dispenser and connected to the rechargeable electrical storage device to recharge the electrical storage device the portable source of recharging current including a thermoelectric generator module mounted to the container body with
a hot side in thermal communication with the air within the interior of the hollow body, and
a cold side in thermal communication with ambient air outside of the interior of the hollow body,
said thermoelectric generator module generating electrical power to charge the rechargeable storage device in response to heat flowing through the thermoelectric generator module.

2. The hot beverage dispenser of claim 1 in which the thermoelectric generator module includes a housing that substantially entirely surrounds, electrically and thermally insulates and protectively covers the thermoelectric generator module except for
a thermally conductive cold plate attached to the cold side and being in thermal communication with ambient air outside of the hollow body, and
a hot plate attached to the hot side and being in thermal communication with the ambient air within the hollow body.

3. The hot beverage dispenser of claim 1 including a thermally conductive cold plate attached to the cold side of the thermoelectric generator module, said cold plate being directly connected to and having a substantially larger surface area than the cold side and being directly exposed to ambient air outside of the hollow body.

4. The hot beverage dispenser of claim 3 in the hot side includes a thermally conductive hot plate attached to the hot side of the thermoelectric generator module, said hot plate being directly connected to and having a substantially larger surface area than the hot side and being directly exposed to interior air within the hollow body.

5. The hot beverage dispenser of claim 1 in which the hot side includes a thermally conductive hot plate attached to the hot side of the thermoelectric generator module, said hot plate being directly connected to and having a substantially larger surface area than the hot side and being directly exposed to the interior air within the hollow body.

6. The hot beverage dispenser of claim 1 including an annularly shaped housing for the display and rechargeable electrical storage device, said housing being releasably mounted within the open top to partly close the top, said housing also having a passageway defining an inlet smaller than the open top through which hot beverage is received into the interior of the hollow container body.

7. The hot beverage dispenser of claim 1 in which the thermoelectric generator module is sandwiched between
a thermally conductive hot plate attached to the hot side within the interior, and
a thermally conductive cold plate attached to the cold side without the interior of the hollow body.

8. The hot beverage dispenser of claim 7 in which the said hot plate and said cold plate having vertically aligned holes to enable the passage of hot beverage into the interior through the aligned holes.

9. The hot beverage dispenser of claim 8 including an annular housing protectively enclosing the thermoelectric generator module mounted within the open top and having a vertical passageway that is aligned with the aligned holes in the hot plate and the cold plate.

10. The hot beverage dispenser of claim 9 including
a dispense tube with a vertical section attached to and suspended vertically downwardly from the housing and into the interior at one side of the vertical passageway, and
the thermoelectric generator module is located at another side of the passageway that is opposite of the one side to reduce exposure of the thermoelectric generator module to heat from hot beverage passing through the vertical passageway.

11. The hot beverage dispenser of claim 9 in which the thermoelectric generator module is sandwiched between the hot plate and the cold plate at a location spaced from the hole in each of the plates.

12. The hot beverage dispenser of claim 1 in which
the dispenser is an airpot-type dispenser including an elongate dispense tube extending from adjacent the closed bottom to a location exterior of the open top to enable the passage of beverage from the interior of the body to the exterior of the body,
the characteristic sensor is carried by the elongate dispense tube within the interior of the hollow body, and
the thermoelectric generator module is mounted to the dispense tube adjacent the open top and carries electrical connections between
the thermoelectric generator module and the rechargeable electrical storage device, and
the beverage level sensor and the electronic display module.

13. The hot beverage dispenser of claim 12 in which
the dispense tube has a
vertical section extending into the interior and carrying a beverage level sensor,
a non-vertical section extending outwardly to a downturned spout located exteriorly of the hollow body, and
the electronic display module is mounted to the non-vertical section adjacent the downturned spout.

14. The hot beverage dispenser of claim 1 in which the portable source of recharging current includes at least one photovoltaic cell connected with the rechargeable device to provide additional recharging current for the rechargeable device.

15. The hot beverage dispenser of claim 14 including
a power management controller connected with each of the thermoelectric generator module, the photovoltaic cell and the rechargeable electrical storage device,
said power management controller selectively interfacing applying recharging current to the rechargeable electrical storage device.

16. The hot beverage dispenser of claim 1 in which the portable source of recharging current includes at least one photovoltaic cell connected with the rechargeable device to provide recharging current for the rechargeable device.

17. The hot beverage dispenser of claim 1 in which the beverage condition sensor includes at least one of (a) beverage level sensor, (b) a beverage temperature sensor and (b) an elapsed timer indicating the time lapsed since the dispenser was filled with fresh beverage.

* * * * *